(12) United States Patent
Roka et al.

(10) Patent No.: US 8,266,233 B1
(45) Date of Patent: Sep. 11, 2012

(54) SYSTEM AND METHOD FOR ALERT-PRESENTATION CONFLICT RESOLUTION

(75) Inventors: Pujan K. Roka, Olathe, KS (US); Woojae J. Lee, Manhattan, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 741 days.

(21) Appl. No.: 11/834,927

(22) Filed: Aug. 7, 2007

(51) Int. Cl.
*H04B 1/00* (2006.01)
(52) U.S. Cl. .................................................. 709/207
(58) Field of Classification Search ........... 709/204–207
See application file for complete search history.

(56) References Cited

U.S. PATENT DOCUMENTS

| | | | |
|---|---|---|---|
| 7,301,448 B1 * | 11/2007 | Usery et al. ................ | 340/506 |
| 2003/0212646 A1 | 11/2003 | Horvitz | |
| 2005/0085272 A1 * | 4/2005 | Anderson et al. ............ | 455/566 |
| 2005/0169285 A1 * | 8/2005 | Wills et al. .................... | 370/401 |
| 2006/0220799 A1 * | 10/2006 | Boss et al. ............... | 340/309.16 |
| 2007/0067773 A1 | 3/2007 | Hope et al. | |
| 2007/0083872 A1 | 4/2007 | Doshi | |
| 2008/0057910 A1 * | 3/2008 | Thoresson et al. ......... | 455/412.1 |
| 2008/0318560 A1 * | 12/2008 | Reifman ...................... | 455/415 |

OTHER PUBLICATIONS

U.S. Appl. No. 11/046,083, filed on Jan. 28, 2005, entitled "Method and System for Calendar-Based Delivery of Themed User-Interface Skins."
U.S. Appl. No. 11/046,082, filed on Jan. 28, 2005, entitled "Ranked Presentation of User-Interface Display Elements in a User-interface Skin."
U.S. Appl. No. 11/333,964, filed on Jan. 17, 2006, entitled "Method and System for Delivery of User-Interface Skins, Applications and Services to Wireless Devices."
Themes, downloaded from the World Wide Web at http://developer.sprint.com/site/global/develop/technologies/themes/p_themes.jsp on Apr. 23, 2007 and Nov. 7, 2007.

* cited by examiner

*Primary Examiner* — Ian N Moore
*Assistant Examiner* — Thai Nguyen (57) ABSTRACT

A system and method for suppressing operation of alert logic at a communication device so as to reduce a quantity of alerts presented by various alert logic elements, where each alert logic element is operable to cause an alert for a given event to be presented. Conflict-resolution logic executable by a processor may receive an alert notification for the given event, determine which alert logic elements are operable to present an alert for the given event, determine which of the alert logic elements are running and a priority for each of the alert logic elements, suppressing operation of the alert logic elements that are running and do not have the highest priority, and providing alert notification to the alert logic element that is running and having the highest priority. The alert logic element receiving the alert notification causes the alert for the given event to be presented.

25 Claims, 5 Drawing Sheets

SYSTEM AND METHOD FOR ALERT-PRESENTATION CONFLICT RESOLUTION

FIELD OF INVENTION

The present invention relates to communication devices and, more particularly, to communication devices that present alerts for various events, such as receiving e-mail messages at the communication devices.

DESCRIPTION OF RELATED ART

Many people use communication devices to carry out communications. Over time, communication devices, such as cellular phones, have provided an increasing number of ways to carry out communications. For example, early model cellular phones permit a user to carry out communications via voice calls, whereas later model cellular phones permit a user to carry out communications via voice calls and by other means such as sending and receiving text messages, such as e-mail messages.

Communication devices provide means to alert a user to various events. For example, early model cellular phones are operable to provide an alert when incoming voice calls are received at the cellular phones, and later model cellular phones are operable to provide alerts when incoming phone calls or e-mail messages are received at the cellular phones. These alerts are typically provided by a user interface of a communication device.

The user interface has become a significant element of many communication devices, ranging from desktop personal computers to handheld cell phones and personal digital assistants. In early days, the user interface on most devices was monochrome and rudimentary, often limited to simple text display and basic tone output. With advances in both processing power and display and sound driver technology, the user interface has grown to be far more interesting and diverse. Most user interfaces today include full-color high-resolution displays and robust audio output, suitable for presenting images and sounds of all sorts.

One recent trend in user interface technology has been the advent of user interface "skins." As the name suggests, a user interface "skin" is a covering or dressing applied to the core functions of a user interface.

The core functions of a user interface may include elements such as (i) graphical buttons and pull-down menus that a user can select, so as to invoke various device functions, (ii) information-display areas for presenting alerts including text, graphics, and other types of information, (iii) borders and visual casings or windows for containing various display elements, (iv) scroll bars that a user can employ to scroll through displayed information, (v) cursors, such as arrows, for pointing to and highlighting buttons or displayed information, and (vi) audio outputs to provide alerts for various device states or events.

User interface skins can be applied to user interfaces of particular program applications that run on a device or a user interface of the device generally (e.g., to a core device-management application). For example, a particular application may run in its own display window of the device (regardless of whether the window is maximized to fit the entire display screen) and may define its own set of user interface functions. A skin can be applied to such a user interface, in order to enhance visual and/or audible elements of the user interface. As another example, a device may have a core device-management application, such as an operating system application, that supports execution of other applications or implementation of various device functions. Like more specific program applications, the core device-management application may itself define a user interface including user interface functions such as those described above. And a skin can be similarly applied to such a user interface to enhance various elements of the user interface.

A given user interface can have a permanent skin that is hard coded as an integral aspect of the user interface at the time of application-design or device-manufacture. Alternatively, a user interface can be arranged to have any of a variety of skins selected by a user. By way of example, a device or application may come pre-set with a number of skins that a user can select to apply to the user interface. Through an "options" menu, for instance, the user may select a desired skin, and the device or application may apply that skin to the user interface. As another example, a user may visit a website to acquire a new skin for a given user interface and may then direct the device or application to apply that new skin to the user interface.

In some instances, two or more applications, such as a permanent skin and a user selectable skin, may provide alerts for the same given event. Receiving multiple alerts for the same event may be considered a nuisance by some users for at least the reason the users have to acknowledge and/or dismiss the multiple alerts.

SUMMARY

The present invention provides a system and method for suppressing operation of alert logic so as to reduce a quantity of alerts presented by various alert logic elements, where each alert logic element is operable to cause an alert to be presented for a given event, such as receiving notification at a communication device that a message is available for downloading to the communication device. The various alert logic elements may be part of an original equipment manufacturer operating system application, part of a permanent skin application, part of a user-selectable skin application, or some other arrangement of program logic.

Prior to the invention, multiple alert logic elements could each receive an alert notification for a given event and responsively provide a respective alert for the given event. The invention provides for conflict-resolution logic that suppresses operation of one or more alert logic elements such that only one alert logic element (i) receives an alert notification for the given event and (ii) provides an alert for the given event. In this way, a user of the communication device does not receive multiple alerts for the same event.

In one respect, an exemplary embodiment of the present invention may take the form of a system that comprises a user interface, a processor, and data storage containing conflict-resolution logic, first alert logic, and second alert logic. The first alert logic and the second alert logic are each executable by the processor to cause an alert for a given event to be presented via the user interface in response to receiving an alert notification for the given event. The conflict-resolution logic is executable to detect an occurrence of the given event and to responsively determine whether the first alert logic is running. If the conflict-resolution logic determines the first alert logic is running, the conflict-resolution logic suppresses operation of the second alert logic with respect to the detected event by not providing the second alert logic with an alert notification for the detected event. Otherwise, if the conflict-resolution logic determines the first alert logic is not running, the conflict-resolution logic sends to the second alert logic an alert notification for the detected event.

In another respect, an exemplary embodiment of the present invention may take the form of a method including (i) at data storage, maintaining conflict-resolution logic, first alert logic, and second alert logic, and (ii) detecting an occurrence of a given event and responsively executing the conflict-resolution logic so as to determine whether the first alert logic is running. The first alert logic and the second alert logic are each operable to cause an alert for the given event in response to receiving an alert notification for the given event. If the conflict-resolution logic determines the first alert logic is running, executing the conflict-resolution logic further comprises suppressing operation of the second alert logic with respect to the detected event by not providing the second alert logic with an alert notification for the detected event. Otherwise, if the conflict-resolution logic determines the first alert logic is not running, executing the conflict-resolution logic further comprises sending to the second alert logic an alert notification for the detected event.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

Reference numerals are shown in the drawings to identify various elements of the drawings. Drawing elements having identical reference numerals are substantially identical or identical elements.

DETAILED DESCRIPTION

1. Overview

The present invention provides a system and method for suppressing operation of alert logic so as to reduce a quantity of alerts presented by various alert logic elements, where each alert logic element is operable to cause an alert to be presented for a given event. The given event may comprise any of a variety of events such as receiving notification at a communication device that a message is available for downloading to the communication device, or receiving the message at the communication device. The downloadable message and/or the received message may comprise an e-mail message, a short message system (SMS) message, an instant message (IM), a voice mail message, a news message, a weather message, a multi-media message system (MMS) message, and/or some other type of message.

Alternatively, the given event may comprise expiration of a timer at the communication device or the communication device detecting that a monitored date and time equals or is later than a set date and time for an appointment. Other examples of the given event are also possible. For purposes of example in this detailed description, unless defined differently, the given event will be considered to be receiving notification that an e-mail message has been received at the communication device.

The communication device may comprise (i) a wireless communication device, such as a cellular phone or a wireless personal digital assistant, (ii) a wireline communication device, such as a landline telephone or a desktop personal computer having an interface to a wireline network, or (iii) a wireless and wireline communication device operable to communicate via a wireless network and a wireline network, such as a desktop personal computer having an interface to a wireless network and a wireline network.

Figure 1A:
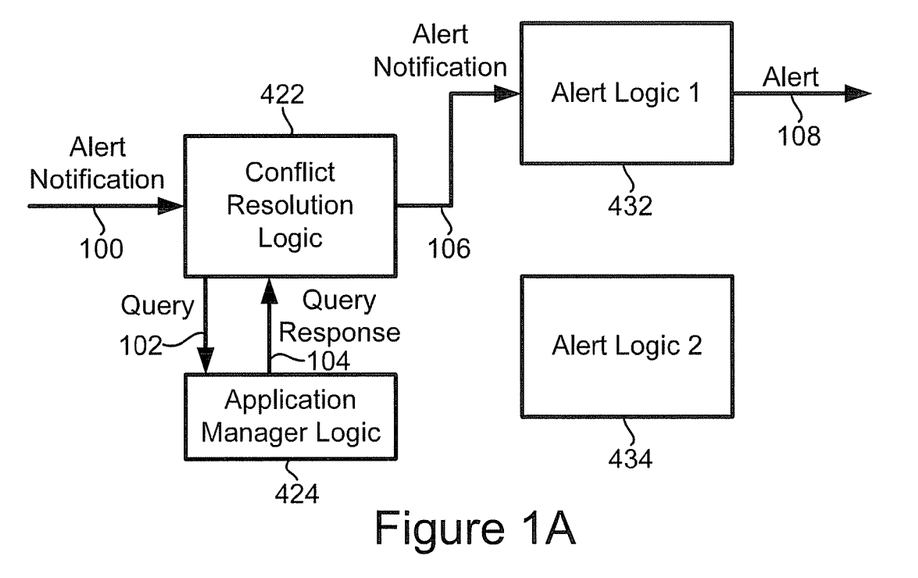
FIGS. 1A and 1B are block diagrams depicting exemplary communication that may be carried out in accordance with an exemplary embodiment of the present invention.
Figure 1B:
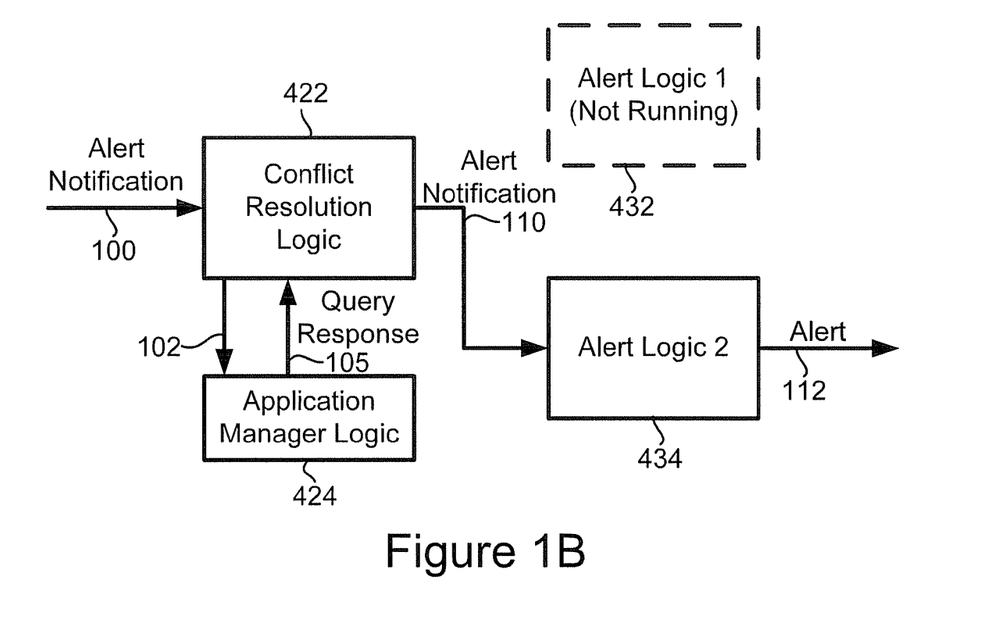

FIGS. 1A and 1B each depict a flow diagram in accordance with the present invention. FIGS. 1A and 1B each depict conflict-resolution logic 422, application manager logic 424, and alert logic 432, 434. The logic shown with solid lines represents logic that is "running" (e.g., being executed by a processor), whereas the logic shown with dashed lines represents logic that is "not running" (e.g., not being executed by a processor). The application manager logic 424 (also referred to herein as an "application manager") manages other logic (e.g., the conflict-resolution logic 422 and the alert logic 432, 434) that is running.

The conflict-resolution logic 422 receives an alert notification 100 for a given event. The conflict-resolution logic 422 detects occurrence of the given event and responsively makes a determination whether alert logic 432 is running. Conflict-resolution logic 422 may send to the application manager logic 424 a query 102 to inquire whether alert logic 432 is running. The application manager 424 may send a query response that indicates whether alert logic 432 is running.

In FIG. 1A, alert logic 432 is running and a query response 104 indicates that alert logic 432 is running. In response to receiving query response 104, conflict-resolution logic 422 determines alert logic 432 is running and responsively suppresses operation of the alert logic 434 with respect to the detected event by not providing alert logic 434 with an alert notification for the detected event. Conflict-resolution logic 422 provides alert logic 432 with an alert notification 106. In response to receiving alert notification 106, alert logic 432 causes an alert 108 for the detected event to be presented to a user of the communication device.

In FIG. 1B, alert logic 432 is not running and the query response 105 indicates that alert logic 432 is not running. In response to receiving query response 105, conflict-resolution logic 422 determines alert logic 432 is not running and responsively provides alert logic 434 with an alert notification 110. In response to receiving alert notification 110, alert logic 434 causes an alert 112 for the detected event to be presented to the user of the communication device.

Figure 2:
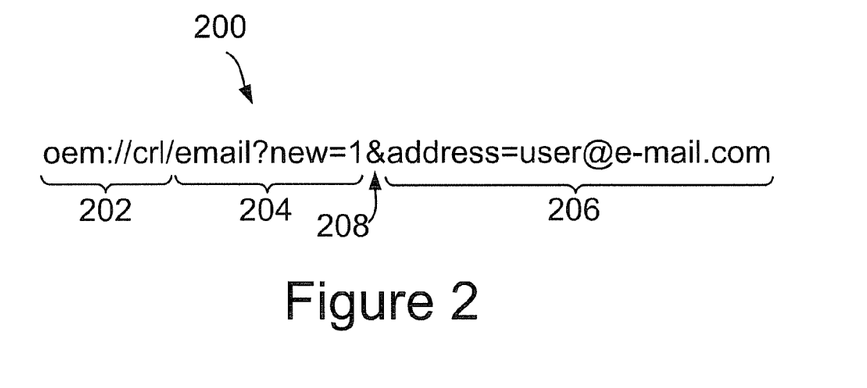
FIGS. 2 and 3 depict exemplary Uniform Resource Indicators (URIs) in accordance with an exemplary embodiment of the present invention.

The alert notification 100 may be arranged in any of a variety of configurations. For example, the alert notification 100 may be arranged as a uniform resource indicator (URI). FIG. 2 depicts an exemplary URI 200 that includes a header 202, a message indicator 204, an account indicator 206, and a delimiter 208 located between the message indicator 204 and the account indicator 206.

The header 202 includes the characters "crl" to indicate that the URI 200 is addressed to the conflict-resolution logic (CRL) 222. Alternatively, the characters "crl/" of the header may be omitted so that the URI 200 is not addressed to the conflict-resolution logic 222. Other examples of the header 202 are also possible.

The message indicator 204 indicates there is one new e-mail message and the account indicator 206 indicates an e-mail account to which the new e-mail message is addressed. Alternatively, the message indicator 204 could indicate a quantity of new e-mail messages greater than or less than one new e-mail message and/or a quantity of e-mail messages that have been classified as having been read by the user of the e-mail account.

Figure 3:
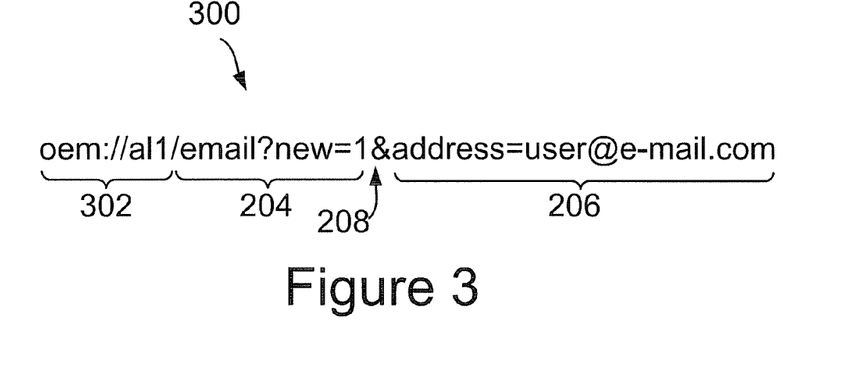

The alert notification 106 and the alert notification 110 may be identical to the alert notification 100. For example, the alert notification 106 and the alert notification 110 may comprise URI 200. Alternatively, the alert notification 106 and/or the alert notification 110 may not be identical to the alert notification 100. For example, the alert notification 106 may be arranged as the URI 300 shown in FIG. 3. As shown in FIG. 3, the URI includes a header 302, the message indicator 204, the account indicator 206, and the delimiter 208. The header 302 may comprise the characters "al1" (or alternatively "alert logic 1") to indicate the URI 300 is addressed to alert logic 432. Similarly, the alert notification 110 may be arranged as a URI that includes: (i) a header comprising the characters "al2" (or alternatively "alert logic 2") to indicate the URI is addressed to alert logic 434, (ii) the message indicator 204, (iii) the account indicator 206, and (iv) the delimiter 208. Other examples of the alert notifications 100, 106, 110 and other examples of the headers 202, 302, the message indicator 204, the account indicator 206, and the delimiter 208 are also possible.

2. Exemplary Architecture

Figure 4:
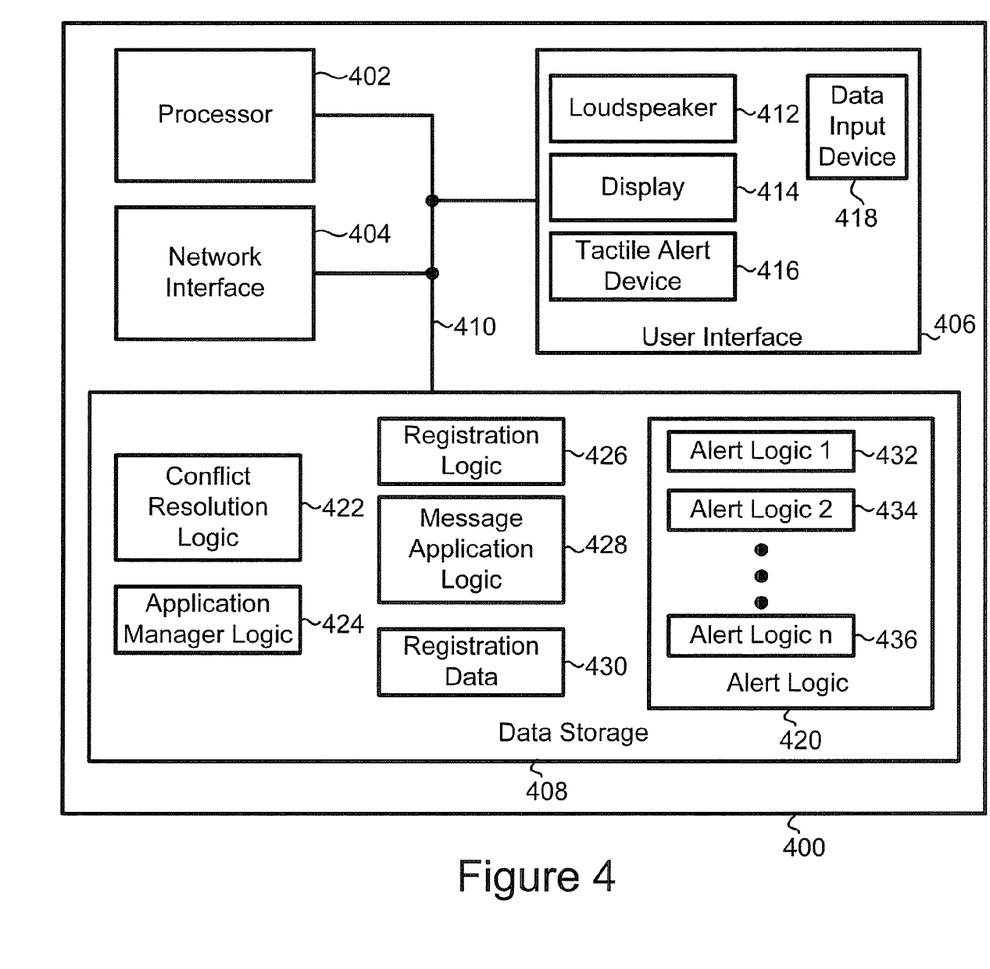
FIG. 4 is a block diagram of an exemplary embodiment of the present invention.

FIG. 4 depicts an exemplary system 400 for carrying out the present invention. As shown in FIG. 4, system 400 includes a processor 402, a network interface 404, a user interface 406, and data storage 408, all linked together via a system bus, network, or other connection mechanism 410. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software. Further still, various functions described herein may be carried out by the processor 402 executing instructions stored in the data storage 408.

Figure 5:
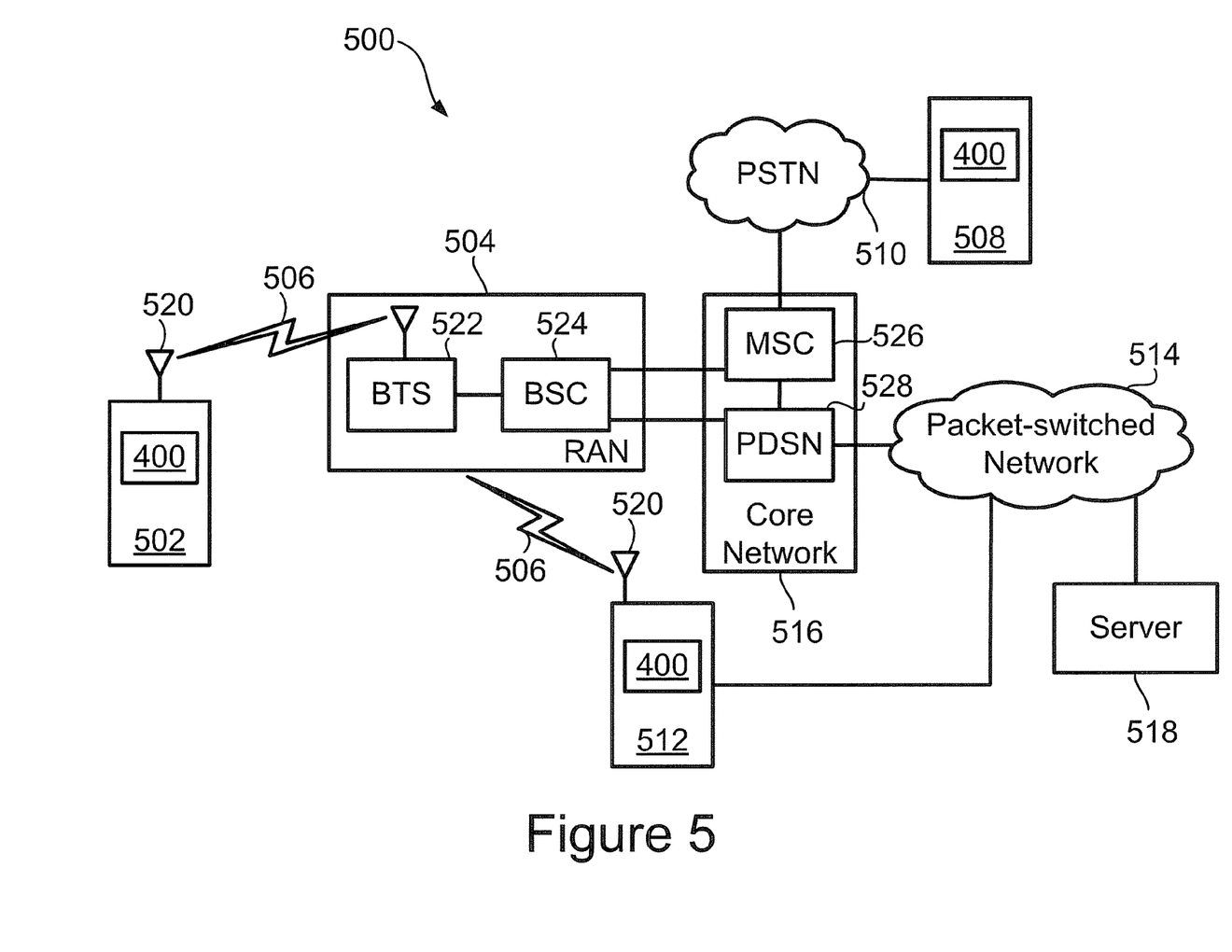
FIG. 5 is a block diagram of a network architecture in which the exemplary embodiment may be implemented.

System 400 may operate at and/or within any of a variety of devices. In one respect, system 400 may be integrated within a single device. In another respect, system 400 may be distributed across multiple devices. FIG. 5 depicts exemplary network architecture 500 comprising three separate communication devices that each comprise system 400. As shown in FIG. 5, system 400 is located at and/or within (i) a wireless communication device 502 that interfaces to a radio access network (RAN) 504 via an air interface 506, (ii) a wired communication device 508 that interfaces to a public switched telephone network (PSTN) 510, and (iii) a communication device 512 that is part of a packet-switched network 514 and that interfaces to the RAN 504 via the air interface 506. Additional details regarding FIG. 5 are discussed below.

Returning to FIG. 4, processor 402 may comprise one or more general purpose processors (e.g., INTEL microprocessors) and/or one or more special purpose processors (e.g., digital signal processors). Processor 402 may execute computer-readable program logic, such as the program logic contained in data storage 408.

Network interface 404 provides an interface to one or more communication networks, such as the RAN 504, the PSTN 510, and/or the packet-switched network 514. As an example, the network interface 404 of wireless communication device 502 may provide an interface to the RAN 504. In this regard, the network interface 404 may comprise a chipset and antenna 520 for performing wireless communication over the air interface 506. An example of a chipset that facilitates communication according to the Code Division Multiple Access (CDMA) air interface protocol is the MSM6800 chipset manufactured by Qualcomm Incorporated of San Diego, Calif. Other examples of a chipset for performing wireless communication over the air interface 506 are also possible.

As another example, the network interface 404 of communication device 508 may provide an interface to a local loop of the PSTN 510. The local loop may comprise circuitry that connects the network interface 404 to a Central Office of a Local Exchange Carrier functioning as part of the PSTN 510. In accordance with this example, the network interface 404 may comprise a modem operable to transmit messages to and receive messages from the local loop.

As yet another example, the network interface 404 of communication device 512 may provide an interface to a transport link (e.g., a Category 5E cable) of the packet-switched network 514. In this regard, the network interface 404 may comprise a network interface card (NIC) operable to transmit messages to and receive messages from the transport link in accordance with an Institute of Electrical and Electronic Engineers (IEEE) standard for Ethernet communications, such as an IEEE 802.3 standard. Additionally, the network interface 404 of communication device 512 may comprise a chipset and antenna 520 for performing wireless communication over the air interface 506. Other examples of the network interface 404 are also possible.

The network interface 404 is operable to transmit messages to and receive messages from one or more of the networks 504, 510, 514. As an example, the network interface 404 of communication device 502 may receive a notification message from the RAN 504 that indicates a message, such as an e-mail message, is available for transmission to a user of communication device 502. As another example, the network interface 404 may receive the e-mail message or another type of message addressed to the user of the communication device 502.

User interface 406 may include any of a variety of devices for receiving data from and/or presenting data (e.g., an alert for a given event) to a user. As shown in FIG. 4, user interface 406 includes a loudspeaker 412, a display 414, a tactile alert device 416, and a data input device 418.

The loudspeaker 412 may play out audible alerts and other audible data to a user of the system 400. As an example, the loudspeaker 412 may play out an audible alert that indicates a message has been received by the network interface 404. As another example, the loudspeaker 412 may play out the message received by the network interface 404. As yet another example, the loudspeaker may play out voice communications received at the network interface 404 during a voice call in which a user of the system 400 is engaging in. Other examples of an audible alert and other examples of audible data that may be played out at loudspeaker 412 are also possible.

The display 414 may comprise any of a variety of displays. For example, the display 414 may comprise a liquid crystal display (LCD), a cathode ray tube (CRT) display, a plasma display, or some other display. The display 414 may function to display visual alerts and other visual data to a user of the system 400. As an example, the display 414 may display a visual alert that indicates a notification message regarding an e-mail message has been received by network interface 404. As another example, the display 414 may display the e-mail message. Other examples of a visual alert and visual data displayable at display 414 are also possible.

The tactile alert device 416 may function to provide tactile alerts to a user of system 400. The tactile alert device 416 may comprise (i) a motor having a spindle and a weight attached to the motor spindle, and/or (ii) a vibrating battery. The tactile alert device 416 may function to cause the system 400 to vibrate. As an example, the tactile alert device 416 may provide a tactile alert so as to alert a user that a message has been received by the network interface 404. Other examples of the tactile alert device 416 and other examples of when a tactile alert is provided are also possible.

The data input device 418 may comprise any of a variety of devices for receiving data from a user of the system 400. For example, the data input device 418 may comprise a microphone and electronic circuitry for detecting audible data (e.g., voice communications) provided by the user. As another example, the data input device 418 may comprise a keypad including one or more keys for entering alphanumeric characters and other symbols, such as some or all of the alphanumeric characters and symbols shown on a typical QWERTY keyboard that connects to a communication device, such as a laptop personal computer. As yet another example, the data input device 418 may comprise a mouse that connects to a serial port or a universal serial bus (USB) port of a communication device, such as a desktop personal computer.

The data input device 418 is operable by the user to input various types of data. For example, the data input device 418 is operable by the user to input (i) voice communication data for a voice call the user is engaging in, (ii) data to acknowledge an alert or to dismiss an alert currently being presented to the user, and/or (iii) registration data 430. The data input via the data input device 418 may be provided from the data input device 418 to another portion of the system 400, such as the processor 402, the user interface 406, or the data storage 408. Other examples of data that may be input via the data input device 418 are also possible.

Data storage 408 comprises a computer readable medium. A computer readable medium may comprise volatile and/or non-volatile storage components, such as optical, magnetic, organic or other memory or disc storage, which can be integrated in whole or in part with the processor 402. Alternatively, the entire computer readable medium may be remote from processor 402 and coupled to processor 402 by connection mechanism 410.

Data storage 408 may maintain various types of data, such as computer-readable program logic executable by the processor 402 and computer-readable registration data 430 that the processor 402 may refer to during execution of the computer-readable program logic. By way of example, the computer-readable program logic may comprise alert logic 420, conflict-resolution logic 422, application manger logic 424, registration logic 426, and message application logic 428.

The message application logic 428 may comprise program logic executable to cause messages to be presented via the user interface 406. For example, the message application logic 428 may comprise program logic that is arranged as an e-mail application operable to cause the user interface 406 to display e-mail messages received at the network interface 404. As another example, the message application logic 428 may comprise program logic that is arranged as a voice mail message application operable to cause the user interface 406 to playout voice mail messages received at the network interface 404. Similarly, the message application logic 428 may comprise program logic arranged to cause the user interface 406 to display and/or playout SMS messages, IM messages, MMS messages, news messages, weather messages, or some other type of message.

The network interface 404 may receive notification that a message is available for downloading and/or may receive the downloadable message and, thereafter, provide the received notification and/or received message to the message application logic 428. In response to receiving the notification or the message, the message application logic 428 may provide the received notification or another notification to the conflict-resolution logic 422. Either of these notifications may be the alert notification 100 shown in FIG. 1.

The alert logic 420 comprises a plurality of alert logic elements, such as alert logic 432, alert logic 434, and alert logic 436. Alternatively, the alert logic 420 may comprise a number of alert logic elements greater than or less than three alert logic elements. Each alert logic element is operable to cause an alert for a given event to be presented via the user interface 406 and may present the alert in response to receiving an alert notification for the given event. One or more of these alert logic elements may be stored in the data storage 408 at the time the system 400 is manufactured. As an example, one or more of alert logic elements 432, 434, 436 may be arranged as a permanent skin application or as part of a permanent skin application. Program logic stored at the data storage 408 at the time the system 400 is manufactured is referred to hereinafter as "original equipment manufacturer" (OEM) logic.

Alternatively, one or more of the alert logic elements may be stored in the data storage 408 after the system 400 is manufactured, such as at a time after a user has purchased a device including the system 400 (hereinafter "aftermarket alert logic"). The aftermarket alert logic may comprise alert logic from the OEM or from a third-party provider. The aftermarket alert logic may comprise a user selectable skin application that is executable by the processor 402.

Each alert logic element may comprise and/or be associated with data that describes that alert logic element. For example, alert logic 432 may be associated with a generic content descriptor (GCD) file including data describing alert logic 432. A GCD file may be provided to the data storage 408 at or substantially at the same time the alert logic associated with the GCD file is provided to the data storage 408.

Figure 6:
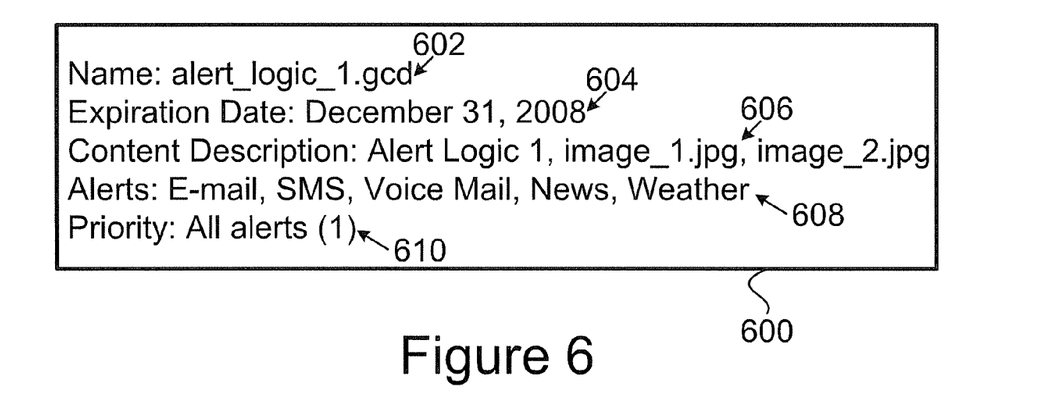
FIG. 6 depicts exemplary registration data in accordance with an exemplary embodiment of the present invention.

FIG. 6 depicts an exemplary GCD file 600 associated with alert logic 432. As shown in FIG. 6, GCD file 600 comprises: (i) name data 602 that indicates a name of the GCD file 600 (e.g., "alert_logic_1.gcd"), (ii) expiration date data 604 that indicates an expiration date (e.g., Dec. 31, 2008) when the alert logic 432 expires (e.g., is no longer useable by the system 400), (iii) content description data 606 that indicates the content associated with the GCD file 600 and/or the alert logic 432, (iv) alert data 608 that indicates the types of alerts that alert logic 432 may provide, and (v) priority data 610 that indicates a priority for the types of alert identified by the alert data 608 relative to the priority of those types of alerts provided by other alert logic.

As shown in FIG. 6, the content description data 606 indicates the alert logic 1 (i.e., alert logic 432) and two image files (i.e., image_1.jpg and image_2.jpg) are associated with the GCD file 600. Execution of the alert logic 432 may cause the two image files to be displayed at the display 414 when presenting any of the alerts identified by the alert data 608. The alert data 608 indicates the alerts provided by alert logic 1 include alerts for e-mail messages, SMS messages, voice mail messages, news messages, and weather messages. The priority data 610 indicates that all of the alerts provided by alert logic 1 have a priority of "1" (i.e., top priority).

Alternatively, the priority data 610 could identify various priorities for each type of alert that may be provided by alert logic 1. For instance, the priority data 610 could indicate the priority for e-mail messages is "1," the priority for SMS messages is "2," the priority for voice mail messages is "1," the priority for news messages is "3," and the priority for weather messages is "1." In this regard, if an SMS message is received at the network interface 404 and if alert logic having a priority of "1" for SMS messages is running, then the alert logic having a priority of "2" for SMS messages will be suppressed so as to not provide an alert in response to the network interface receiving the SMS message. In other words, if higher priority alert logic is running, lower priority alert logic operable to present an alert for the same event will be suppressed. Other examples of a GCD file and other examples of data 602, 604, 606, 608, 610 are also possible.

The registration logic 426 is executable to register each alert logic element stored at data storage 408 or that is to be stored at the data storage 408. The processor 402 and the registration logic 426 provides means for the conflict-resolution logic 422 to determine which alert logic elements are stored in the data storage 408, the type of message alert that each alert logic element is operable to provide, and a priority of each alert logic element for a given type of message alert. As an example, execution of the registration logic 426 may cause the registration data 430 to be searched so as to make the various determinations. The processor 402 and the registration logic 426 also provide means to create, modify, or delete the registration data 430. Exemplary registration data 430 is shown in Table 1.

TABLE 1

Registration Data

| | Types of Messages for which the Alert Logic is Operable to Provide an Alert | | | | | | |
|---|---|---|---|---|---|---|---|
| | E-mail | SMS | MMS | Voice-mail | IM | News | Weather |
| Alert logic 1 | Yes (1) | Yes (1) | No | Yes (1) | No | Yes (1) | Yes (1) |
| Alert logic 2 | Yes (2) | Yes (2) | Yes (1) | Yes (3) | Yes (1) | Yes (2) | Yes (2) |
| Alert logic n | No | Yes (3) | No | Yes (2) | No | No | No |

The data in Table 1 includes data in the form "Yes (Priority)" to indicate the alert logic in that row is operable to provide an alert pertaining to a given type of message and the priority of that alert logic for providing the alert (relative to the priority of other alert logic for providing the alert for the given type of message). The data in Table 1 also includes data in the form "No" to indicate the alert logic in that row is not operable to provide an alert pertaining to a given type of message.

As an example, the alert logic 1 (i.e., alert logic 432) is operable to provide alerts pertaining to e-mail messages, SMS messages, voice mail messages, news messages, and weather messages, but is not operable to provide alerts pertaining to MMS messages and IM messages. The priority for each of the alerts that alert logic 1 can provide is "1." As another example, the alert logic 2 (i.e., alert logic 434) is operable to provide alerts pertaining to e-mail messages, SMS messages, MMS messages, voice mail messages, instant messages, news messages, and weather messages. The priority of e-mail messages alerts for alert logic 2 is lower (i.e., priority 2) than the priority of e-mail messages for alert logic 1 (i.e., priority 1). In this way, if alert logic 1 and alert logic 2 are both running when an e-mail message is received at the network interface 404, the conflict-resolution logic 422 suppresses execution of the alert logic 2 such that only alert logic 1 will provide an alert in response to the received e-mail message.

The conflict-resolution logic 422 is executable to detect an occurrence of a given event. The conflict-resolution logic 422 may detect occurrence of the given even by receiving from the message application logic 428 or some other program logic a message (e.g., the alert notification 100) regarding the given event.

In response to detecting occurrence of the given event, the conflict-resolution logic 422 is executable to determine which alert logic element or elements of alert logic 420 is/are operable to provide an alert for the given event. The conflict-resolution logic 422 may make this determination by searching the registration data 430 and/or the GCD file associated with each alert logic element. Alternatively, the conflict-resolution logic 422 may make this determination by requesting other program logic (e.g., the registration logic) to make the determination and thereafter receiving from the other program logic a message that indicates which alert logic element or elements may provide an alert for the given event.

Additionally, the conflict-resolution logic 422 may determine which alert logic is operable to present an alert for the given event is running. As an example, the conflict resolution logic 422 may send the query 102 to the application manager logic 424. The application manager logic 424 comprises program instructions executable to (i) manage other control logic within data storage 408, (ii) determine whether given program logic, such as the alert logic 432, is running, and (iii) in response to receiving the query 102, send to the conflict-resolution logic 422 a query response 104, 105 indicating whether the given program logic is running.

If the conflict-resolution logic 422 determines the alert logic 432 is running, the conflict-resolution logic 422 suppresses operation of the alert logic 434 and/or any other alert logic that is running and that may provide an alert for the given event. In one respect, the conflict-resolution logic 422 may suppress operation of the alert logic 434 by not providing an alert notification to the alert logic 434 and/or by preventing an alert notification for the given event from being received by the alert logic 434.

In another respect, the conflict-resolution logic 422 may suppress operation of the alert logic 434 by notifying the alert logic 434 not to provide an alert for the given event, such that the alert logic 434 sets a program logic flag that indicates it should not provide an alert for the given event. In this way, the alert notification for the given event may be sent to the alert logic 434 and the alert logic 434 will not provide an alert for the given event. The program logic flag may be cleared (e.g., reset) in response to the alert logic 434 receiving the alert notification such that, thereafter, the alert logic 434 is again operable to provide an alert for the given event upon receiving an alert notification for another instance of the given event. Alternatively, the program logic flag may remain set to indicate the program logic 434 should not provide the alert until such time that conflict-resolution logic 422 notifies the alert logic 434 to reset the program logic flag to a state in which the alert logic 434 is to provide the alert in response to receiving an alert notification for another instance of the given event.

After determining the alert logic 432 is running, the conflict-resolution logic 422 may provide the alert notification 106 to the alert logic 432. In response to receiving the alert notification 106, the alert logic 432 may be executed to cause the alert 108 to be played out at the user interface 406.

If the conflict-resolution logic 422 determines the alert logic 432 is not running, the conflict-resolution logic 422 sends to the alert logic 434 the alert notification 110. In response to receiving the alert notification 110, the alert logic 434 may be executed to cause the alert 112 to be played out at the user interface 406.

In addition to suppressing operation of alert logic 434, the conflict-resolution logic 422 may suppress operation of other alert logic operable to present an alert for the given event. The conflict-resolution logic 422 may suppress operation of the other alert logic using the same method in which operation of alert logic 434 is suppressed. The conflict-resolution logic 422 may suppress operation of alert logic 434 and/or the other alert logic based on the priority of the alert logic 434 and the priority of the other alert logic in comparison to the priority of the alert logic 432. In this regard, the conflict-resolution logic 422 may access the priority data of the registration data 430 to determine the priority of each alert logic element operable to present an alert for the given event and to suppress operation of the alert logic that is running and that has a priority less than the priority of the alert logic that is running and that has the greatest priority for the given event (e.g., alert logic 432).

Returning to FIG. 5, the exemplary network architecture 500 also includes a core network 516 and a server 518. The packet-switched network 514 may comprise the server 518. Alternatively, the core network 518 or another network may comprise the server 518. The RAN 504 and the core network 516 may be operated by a wireless carrier that provides wireless service to communication devices 502, 512, and one or more other wireless communication devices (not shown).

The RAN 504 includes a base transceiver station (BTS) 522 and a base station controller (BSC) 524. The BSC 524 manages wireless communication resources, such as the BTS 522, for given cells and sectors formed by the BTS 522. The BSC 524 may also manage wireless communication resources, such as one or more other BTSs, for given cells and sectors formed by the one or more other BTSs. BTS 522 and the other BTSs may each comprise one or more radio frequency (RF) transceivers (e.g., an integrated RF transmitter and receiver) and one or more antennas.

The core network 516 may comprise various devices such as (i) an operations and maintenance device for the RAN 504, (ii) a subscriber database device for performing functions such as authentication of wireless communication devices accessing the RAN 504, and (iii) gateway devices, such as a mobile switching center (MSC) 528 and a packet data serving node (PDSN) 530, to provide access to other networks, such as the PSTN 510 and the packet-switched network 514. The MSC 528 is a switch for connecting the BSC 524 to the PSTN 510 so as to allow calls to be carried out between two communication devices, such as communication devices 502, 508.

The server 518 may comprise a processor that executes program instructions for client devices, such as communication devices 502, 508, 512. The server 518 is operable to send any of a variety of messages, such as an e-mail message, an SMS message, an IM message, a voice mail message, a news message, a weather message, an MMS message, or some other type of message, to one of the communication devices 502, 508, 512. As an example, the server 518 may be operated by a service provider that provides weather messages to warn users of adverse weather conditions for a user-selectable location, or by a service provider (e.g., a news organization) that provides news alerts to users so as to inform the users of "breaking news."

A message sent from the server 518 to the communication device 502 may be transmitted to the communication device 502 via a network path including the packet-switched network 514, the PDSN 530, the BSC 522, and the air interface 506. A message sent from the server 518 to the communication device 508 may be transmitted to the communication device 508 via a network path including the packet-switched network 514, the PDSN 530, the MSC 526, and the PSTN 510. A message sent from the server 518 to the communication device 512 may be transmitted to the communication device 502 via a network path including the packet-switched network 514. Other examples of paths a message may travel from the server 518 to communication devices 502, 508, 512 are also possible.

One of ordinary skill in the art will realize that network architecture 500 may comprise other devices such as one or more additional communication devices and/or one or more additional servers. The one or more additional communication devices may interface to any of the networks of network architecture 500. The one or more additional servers may be operable to execute program instructions for one or more client devices, such as communication device 502 and/or the one or more additional communication devices. For example, the one or more additional servers may execute program instructions that (i) cause transmission of notification regarding a given type of message (e.g., an e-mail message) to communication device 502, and (ii) cause transmission of the given type of message to communication device 502.

3. Exemplary Operation

Figure 7:
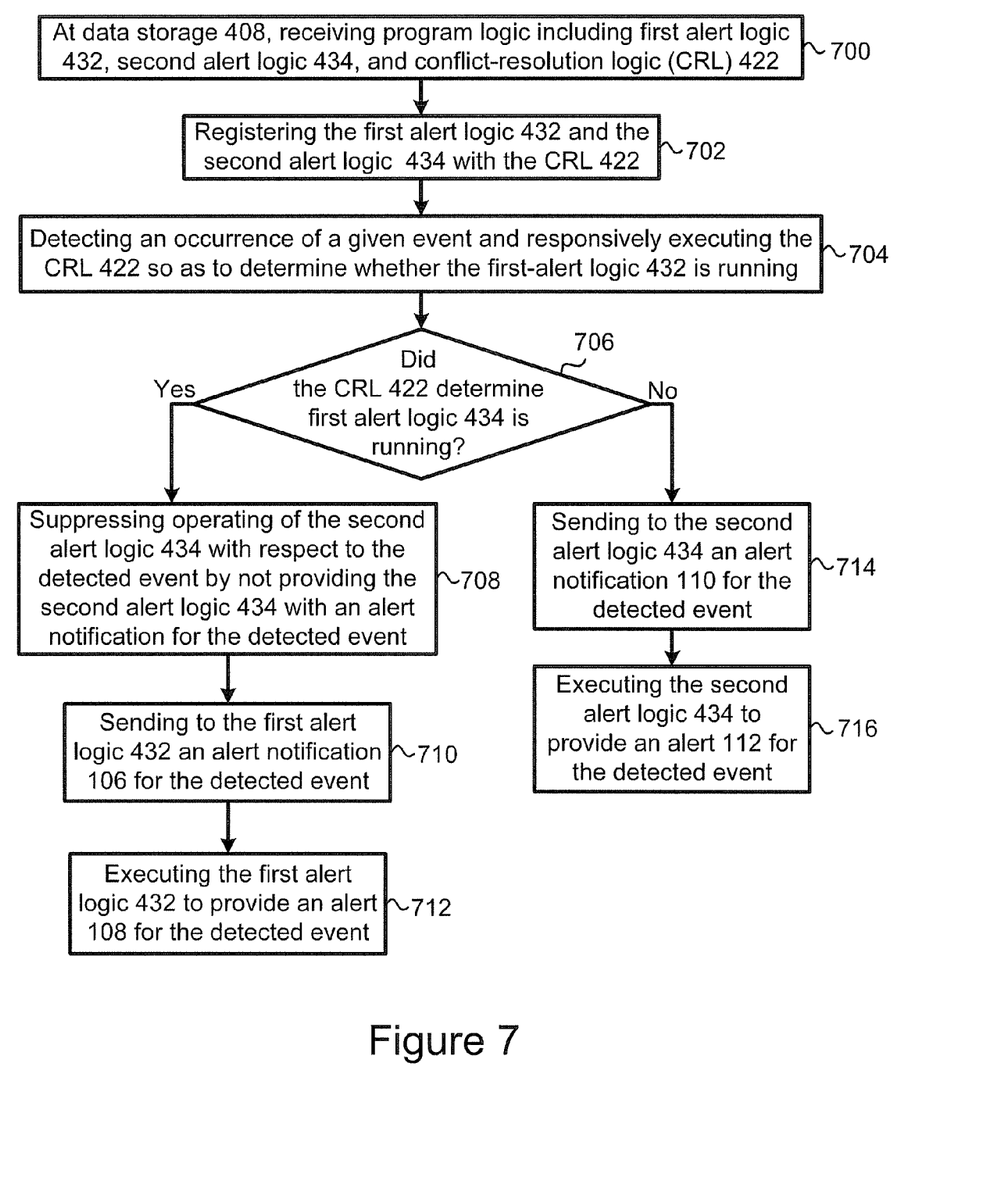
FIG. 7 is a flow chart depicting a set of functions that can be carried out in accordance with an exemplary embodiment.

FIG. 7 is a flow chart provided to illustrate a set of functions that may be carried out in accordance with an exemplary embodiment of the present invention. As shown in FIG. 7, block 700 includes at the data storage 408, receiving program logic including the first alert logic 432, the second alert logic 434, and the conflict-resolution logic 422. The data storage 408 may receive the program logic at various times. For example, the data storage 408 may receive the conflict-resolution logic 422 and the alert logic 434 as OEM logic, and the alert logic 432 as aftermarket logic. As another example, data storage 408 may receive the conflict-resolution logic 422, the alert logic 432, and the alert logic 434 all as OEM logic. Additionally, data storage 408 may receive the alert logic 436, and the alert logic 436 may be received at the same time or at a time after alert logic 432 and alert logic 434 have been stored in the data storage 408. Other examples of when the data storage 408 receives program logic are also possible.

The data storage 408 may store the program logic as the program logic is received at the data storage 408. Alternatively, the data storage 408 may store the program logic after that program logic is received in its entirety. After storing the program logic, data storage 408 may maintain the program logic until the program logic is deleted from the data storage 408. The program logic received at the data storage 408 may comprise any of the other program logic shown in FIG. 4, such as the program logic 424, 426, 428 or other logic.

Next, block 702 includes registering the first alert logic 432 and the second alert logic 434 with the conflict-resolution logic 422. Registration of the alert logic 432 may be carried out prior to the alert logic 432 being stored at the data storage 408, while the alert logic 432 is being stored at the data storage 408, or after the alert logic 432 has been stored at the data storage 408. Similarly, registration of the alert logic 434 may be carried out prior to the alert logic 434 being stored at the data storage 408, while the alert logic 434 is being stored at the data storage 408, or after alert logic 434 has been stored at the data storage 408.

Registering the alert logic 432, 434 may include performing any of a variety of functions that may be carried out, in part or in whole, by executing the registration logic 426. For example, registering the alert logic 432 may include executing the registration logic 426 so as to provide the data storage 408 with registration data for the first alert logic 432 and registration data for the second alert logic 434, such as the registration data shown in the third and fourth rows of in Table 1, respectively.

The registration data 430 may be provided to the data storage 408 in various ways. For example, some or all of the registration data 430 may be provided to the data storage 408 via the user interface 406, namely, the data input device 418. For instance, the priority registration data shown in Table 1 may be provided to the data storage 408 from the data input device 418. As another example, some or all of the registration data 430 may be provided to the data storage 408 from the processor 402 after being derived by the processor 402. For instance, the processor 402 may derive that the priority of the first alert logic 432 is greater than the priority of the second alert logic 434 by reason that the first alert logic 432 was received at the data storage 408 after the second alert logic 434. As yet another example, the registration data 430 may be provided to the data storage 408 in the form of GCD files associated with the first alert logic 432 or the second alert logic 434. Other examples of how the registration data 430 may be provided to the data storage 408 and other examples of how the registration data 430 may be derived are also possible.

Additionally, each of the other alert logic elements of alert logic 420, such as alert logic n 436, may be registered with the conflict-resolution logic 422.

After registering the alert logic with the conflict-resolution logic 422, the conflict-resolution logic 422 may have access to the registration data 430. Alternatively, the conflict-resolution logic 422 can cause the processor 402 to access the registration data 430 and provide some or all of the registration data 430 to the conflict-resolution logic 422.

Additionally, after alert logic is registered with the conflict-resolution logic 422, the registration data 430 may be modified. For example, a user may use the user interface 406 to cause the registration program logic 426 to be executed so that the user can change the registration data 430, such as changing the priority of alert logic 1 for providing e-mail alerts to a priority of "2" and changing the priority of alert logic 2 for providing e-mail alerts to a priority of "1."

As another example, the registration data 430 may be automatically changed by the processor 402 after an expiration date for alert logic has been reached. For example, on Jan. 1, 2009, the processor 402 may execute program logic to change the registration data 430 since the expiration date of alert logic 1 has been reached. In this regard, the registration data 430 may be changed to the data shown in Table 2. A priority of "0" may indicate the alert logic for that row has expired. Other examples of modifying the registration data 430 are also possible.

TABLE 2

Modified Registration Data after Expiration of Alert Logic 1

Types of Messages for which the Alert Logic is Operable to Provide an Alert

|  | E-mail | SMS | MMS | Voice-mail | IM | News | Weather |
|---|---|---|---|---|---|---|---|
| Alert logic 1 | Yes (0) | Yes (0) | No | Yes (0) | No | Yes (0) | Yes (0) |
| Alert logic 2 | Yes (1) | Yes (1) | Yes (1) | Yes (2) | Yes (1) | Yes (1) | Yes (1) |
| Alert logic n | No | Yes (2) | No | Yes (1) | No | No | No |

Next, block 704 includes detecting an occurrence of a given event and responsively executing the conflict-resolution logic 422 so as to determine whether the first alert logic 432 is running Detecting an occurrence of the given event may be carried out in various ways. For example, the conflict-resolution logic 422 may detect occurrence of the given event by receiving the alert notification 100 from the message application logic 428, the processor 402, or some other program logic or device.

In response to detecting occurrence of the given event, the conflict-resolution logic 422 is executable to determine which alert logic is operable to provide an alert for the given event. For example, the conflict-resolution logic 422 may cause the processor 402 to (i) search the registration data 430 to determine and provide notice to the conflict-resolution logic 422 that alert logic 432 and alert logic 434 are both operable to provide an alert for the given event.

In response to detecting occurrence of the given event, the conflict-resolution logic 422 is also executable to determine whether any alert logic operable to provide an alert for the given event is running. As an example, the conflict-resolution logic 422 may send to the application manager logic 424 the query 102 and, thereafter, receive from the application manager 424, the query response 104 that indicates alert logic 432 is running or the query response 105 that indicates alert logic 432 is not running. The conflict-resolution logic 422 may interpret the received query response to determine whether the alert logic 432 is running.

As another example, the conflict-resolution logic 422 may send to the application manager logic 424 a query to determine which of the alert logic elements operable to provide an alert for the given event are running. The conflict-resolution logic 422 may receive from the application manager 424 a query response that indicates alert logic 432 and alert logic 434 are running and that for the given event, the priority of the alert logic 432 is "1" and the priority of the alert logic 434 is "2." The conflict-resolution logic 422 may interpret the received query response to determine whether the alert logic 432 is running.

Next, block 706 and the yes and no lines exiting block 706 are shown to indicate whether the conflict-resolution logic 422 determines if the alert logic 432 is running. If the decision at block 706 is "Yes" (i.e., the conflict-resolution logic 422 determines the first alert logic 432 is running), next, block 708 includes suppressing operation of the second alert logic 434 with respect to the detected event by not providing the second alert logic 434 with an alert notification for the detected event. In this way, only one alert will be provided to the user for the given event.

Additionally, if other alert logic in addition to the alert logic 432, 434 is operable to provide an alert for the given event, in response to determining the first alert logic 432 is running, the process also includes suppressing operation of the other alert logic with respect to the detected event by not providing the other alert logic with an alert notification for the detected event. Similarly, in this way, only one alert will be provided to the user for the given event.

Next, block 710 includes sending to the first alert logic 432 an alert notification 106 for the detected event. The conflict-resolution logic 422 may send the alert notification 106 to the first alert logic 432 in response to determining the first alert logic 432 is running after detecting occurrence of the given event.

Next, block 712 includes executing the first alert logic 432 to provide an alert 108 for the detected event. Executing the first alert logic 432 to provide the alert 108 may be carried out in response to the first alert logic 432 receiving the alert notification 106. Execution of the first alert logic 432 may cause user interface 406 to provide the alert 106. For instance, the user interface 406 may provide an audible alert via loudspeaker 412, a visual alert via display 414, and/or a tactile alert via the tactile alert device 416.

If the decision at block 706 is "No" (i.e., the conflict-resolution logic 422 determines the first alert logic 432 is not running), next, block 714 includes sending to the second alert logic 434 an alert notification 110 for the detected event.

Next, block 716 includes executing the second alert logic 434 to provide an alert 112 for the detected event. Executing the second alert logic 434 to provide the alert 112 may be carried out in response to the second alert logic 434 receiving the alert notification 110. Execution of the second alert logic 434 may cause user interface 406 to provide the alert 112. For instance, the user interface 406 may provide an audible alert via loudspeaker 412, a visual alert via display 414, and/or a tactile alert via the tactile alert device 416.

In an alternative embodiment, the conflict-resolution logic 422 may suppress operation of the second alert logic 434 and/or any other alert logic operable to provide an alert for the given event by sending to the second alert logic 434 and/or the other alert logic a notification that indicates the second alert logic 434 and/or the other alert logic should not provide an alert for the given event. By way of example, in response to receiving this notification, the second alert logic 434 may set a program logic flag that indicates the second alert logic 434 should not provide an alert for the given event. Similarly, the other alert logic may each set a program logic flag that indicates the other alert logic should not provide an alert for the given event.

In this way, an alert notification may be sent to the first alert logic 432, the second alert logic 434, and/or the other alert logic, and all of the alert logic that has set the program logic flag to suppress operation of the alert logic will not provide an alert in response to receiving the alert notification. For example, the first alert logic 432 and the second alert logic 434 may each receive the alert notification, the first alert logic 432 may provide an alert for the given event if the first alert logic 432 did not set its program logic flag to suppress operation of providing an alert for the given event, and the second alert logic 434 may suppress operation of the alert if the program logic flag of the second alert logic 434 is set to suppress operation of the alert.

4. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
   at data storage, maintaining conflict-resolution logic, first alert logic, and second alert logic, wherein the first alert logic is executable by a processor to cause a user interface to present an alert for an incoming communication in response to the first alert logic receiving an alert notification for the incoming communication, and wherein the second alert logic is executable by the processor to cause the user interface to present an alert for the incoming communication in response to the second alert logic receiving an alert notification for the incoming communication, wherein the incoming communication comprises a downloadable message or a received message; and
   while the second alert logic is running, detecting the incoming communication and responsively providing the conflict-resolution logic with a notification of the incoming communication and executing the conflict-resolution logic so as to determine whether the first alert logic is running,
   wherein if the conflict-resolution logic determines the first alert logic is running, executing the conflict-resolution logic further comprises sending to the first alert logic an alert notification for the incoming communication to cause the user interface to present an alert for the incoming communication, and suppressing operation of the second alert logic with respect to the incoming communication by not providing the second alert logic with an alert notification for the incoming communication, and
   wherein if the conflict-resolution logic determines the first alert logic is not running, executing the conflict-resolution logic further comprises sending to the second alert logic an alert notification for the incoming communication to cause the user interface to present an alert for the incoming communication.

2. The method of claim 1, further comprising:
   receiving at the first alert logic the alert notification sent to the first alert logic, and responsively executing the first alert logic so as to cause an alert for the incoming communication to be presented; or
   receiving at the second alert logic the alert notification sent to the second alert logic, and responsively executing the second alert logic so as to cause an alert for the incoming communication to be presented.

3. The method of claim 1,
   wherein the notification of the incoming communication received by the conflict-resolution logic comprises a first uniform resource indicator (URI), and
   wherein the alert notification sent to the first alert logic or the alert notification sent to the second alert logic comprises a second URI.

4. The method of claim 3, wherein the first URI is identical to the second URI.

5. The method of claim 1, further comprising:
   maintaining third alert logic at the data storage, wherein the third alert logic is executable by the processor to cause the user interface to present an alert for the incoming communication in response to the third alert logic receiving an alert notification for the incoming communication; and registering the first alert logic, the second alert logic, and the third alert logic with the conflict-resolution logic so that the conflict-resolution logic has access to (i) data that indicates the first alert logic, the second alert logic, and the third alert logic are each operable to present an alert for the incoming communication, and (ii) priority data that indicates a priority for each of the first alert logic, the second alert logic, and the third alert logic to present an alert for the incoming communication.

6. The method of claim 5, the method further comprising:
at the conflict-resolution logic, accessing the priority data and responsively using the priority data to determine (i) which of the alert logic maintained in the data storage and running within the processor has a greatest priority to present an alert for the incoming communication, and (ii) which of the alert logic maintained in the data storage and running within the processor has a lesser priority to present an alert for the incoming communication in comparison to the alert logic having the greatest priority, wherein the conflict-resolution logic is operable to cause the alert logic running within the processor and having the greatest priority to present an alert for the incoming communication and to suppress operation of the alert logic running within the processor and having the lesser priority, wherein the priority of the first alert logic for the incoming communication is greater than the priority of the second alert logic for the incoming communication, and wherein the priority of the second alert logic for the incoming communication is greater than the priority of the third alert logic for the incoming communication.

7. The method of claim 1, further comprising:
at the data storage, maintaining registration data for alert logic registered with the conflict-resolution logic; and prior to detecting the incoming communication, registering the first alert logic and the second alert logic with the conflict-resolution logic, wherein registering the first alert logic comprises providing the data storage with registration data that indicates (i) the first alert logic is operable to present an alert for the incoming communication, and (ii) a priority of the first alert logic, wherein registering the second alert logic comprises providing the data storage with registration data that indicates (i) the second alert logic is operable to present an alert for the incoming communication, and (ii) a priority of the second alert logic, and wherein the priority of the first alert logic is greater than the priority of the second alert logic.

8. The method of claim 7,
wherein the conflict-resolution logic, first alert logic, and second alert logic are executable by a processor, and wherein executing the conflict-resolution logic to determine whether the first alert logic is running occurs after the processor executes the conflict-resolution logic to determine that the priority of the first alert logic is greater than the priority of the second alert logic.

9. The method of claim 7,
wherein the data storage is located at a wireless communication device, and wherein the priority of the first alert logic and the priority of the second alert logic are selected by a wireless service provider or a user of the wireless communication device.

10. The method of claim 7, wherein providing the data storage with registration data for registering the first alert logic includes providing a generic content descriptor file including the registration data that indicates (i) the first alert logic is operable to present an alert for the incoming communication, and (ii) a priority of the first alert logic.

11. The method of claim 10, wherein the generic content descriptor file also includes an expiration date of the first alert logic and a content description of the first alert logic.

12. The method of claim 1, further comprising:
maintaining message application logic at the data storage,
wherein providing the conflict-resolution logic with a notification of the incoming communication comprises the message application logic providing the notification of the incoming communication to the conflict-resolution logic, wherein the notification comprises a uniform resource indicator (URI) indicating the incoming communication.

13. The method of claim 1,
wherein the data storage is located at a wireless communication device, and wherein incoming communication is selected from the group consisting of (i) an e-mail message available for downloading to the wireless communication device, (ii) an e-mail message received at the wireless communication device, (iii) a short message system (SMS) message available for downloading to the wireless communication device (iv) an SMS message received at the wireless communication device, (v) an instant message (IM) available for downloading to the wireless communication device, (vi) an IM received at the wireless communication device, (vii) a voice mail message available for downloading the wireless communication device, (viii) a voice mail message received at the wireless communication device, (ix) a news message available for downloading to the wireless communication device, (x) a news message received at the wireless communication device, (xi) a weather message available for downloading to the wireless communication device, (xii) a weather message received at the wireless communication device, (xiii) a multi-media message system (MMS) message available for downloading to the wireless communication device, and (xiv) an MMS message at the wireless communication device.

14. The method of claim 1, wherein executing the conflict-resolution logic so as to determine whether the first alert logic is running comprises: (i) the conflict-resolution logic sending to an application manger a query whether the first alert logic is running, and (ii) the conflict-resolution logic processing a query response that indicates whether the first alert logic is running, wherein the application manager sends the query response to the conflict-resolution logic in response to the query.

15. A method comprising:
at data storage, maintaining conflict-resolution logic, first alert logic, and second alert logic, wherein the first alert logic is executable by a processor to cause a user interface to present an alert for an incoming communication in response to the first alert logic receiving an alert notification for the incoming communication, and wherein the second alert logic is executable by the processor to cause the user interface to present an alert for the incoming communication in response to the second alert logic receiving an alert notification for the incoming communication, wherein the incoming communication comprises a downloadable message or a received message; and while the second alert logic is running, detecting the incoming communication and responsively providing the conflict-resolution logic with a notification of the incoming communication and executing the conflict-resolution logic so as to determine whether the first alert logic is running, wherein if the conflict-resolution logic determines the first alert logic is running, executing the conflict-resolution logic further comprises sending to the first alert logic an alert notification for the incoming communication to cause the user interface to present an alert for the incoming communication, and suppressing operation of the second alert logic with respect to the incoming communication by notifying the second alert logic not to provide an alert for the incoming communication so as to cause the second alert logic to set a program logic flag that indicates the second alert logic should not provide an alert for the incoming communication.

16. The method of claim 15, wherein if the conflict-resolution logic determines the first alert logic is running, the method further comprises the first alert logic and the second alert logic each receiving an alert notification for the incoming communication and the first alert logic providing an alert for the incoming communication, and wherein if the conflict-resolution logic determines the first alert logic is not running, the method further comprises the second alert logic receiving an alert notification for the incoming communication and the second alert logic providing an alert for the incoming communication.

17. The method of claim 16, wherein if the conflict-resolution logic determines the first alert logic is running, the method further comprises:

in response to receiving the alert notification for the incoming communication, the second alert logic automatically resetting the program logic flag to a state in which the second alert logic is operable to provide an alert for the incoming communication in response to receiving another alert notification for the incoming communication.

18. A system comprising:

a user interface;

a processor; and data storage containing conflict-resolution logic, first alert logic, and second alert logic, wherein the conflict-resolution logic is executable, while the second alert logic is running, to receive a notification of an incoming communication and to responsively determine whether the first alert logic is running, wherein the incoming communication comprises a downloadable message or a received message, wherein if the conflict-resolution logic determines the first alert logic is running, the conflict-resolution logic sends to the first alert logic an alert notification for the incoming communication and suppresses operation of the second alert logic with respect to the incoming communication by not providing the second alert logic with an alert notification for the incoming communication, wherein if the conflict-resolution logic determines the first alert logic is not running, the conflict-resolution logic sends to the second alert logic an alert notification for the incoming communication, wherein the first alert logic is executable by the processor to cause the user interface to present an alert for the incoming communication in response to the first alert logic receiving the alert notification sent to the first alert logic, and wherein the second alert logic is executable by the processor to cause the user interface to present an alert for the incoming communication in response to the second alert logic receiving the alert notification sent to the second alert logic.

19. The system of claim 18, wherein the incoming communication comprises a message selected from the group consisting of: (i) an e-mail message, (ii) a short message system (SMS) message, (iii) an instant message (IM), (iv) a voice mail message, (v) a news message, (vi) a weather message, and (vii) a multi-media message system (MMS) message.

20. The system of claim 19, wherein the system is located within a wireless communication device.

21. The system of claim 19, wherein the system is located within a wired communication device.

22. The system of claim 18, further comprising:

application manager logic stored at the data storage, wherein the conflict-resolution logic comprises program instructions executable to cause a query regarding whether the first alert logic is running to be sent to the application manager logic, and wherein the application manager logic comprises program instructions executable to cause a query response indicating whether the first alert logic is running to be sent to the conflict-resolution logic in response to receiving the query.

23. The system of claim 18, wherein the user interface comprises a device for presenting an alert for the incoming communication, and where the device comprises a device selected from group consisting of (i) a loudspeaker device, (ii) a display device, and (iii) a tactile alert device.

24. The system of claim 18, further comprising:

registration logic and registration data stored at the data storage, wherein the registration logic is executable to register the first alert logic and the second alert logic with the conflict-resolution logic so that the conflict-resolution logic can determine that the first alert logic and the second alert logic are both executable to cause the alert for the incoming communication, and wherein the registration data indicates whether the first alert logic has a greater priority than the second alert logic.

25. The system of claim 18, wherein the first alert logic is aftermarket program logic and is part of a user interface skin application, and wherein the second alert logic is an original equipment manufacturer program logic.

* * * * *